(12) United States Patent
Goke et al.

(10) Patent No.: US 11,298,648 B2
(45) Date of Patent: Apr. 12, 2022

(54) METHOD AND INSTALLATION FOR OBTAINING HYDROGEN

(71) Applicant: LINDE AKTIENGESELLSCHAFT, Munich (DE)

(72) Inventors: Volker Goke, Geretsried (DE); Christian Voss, Geretsried (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 518 days.

(21) Appl. No.: 16/343,201

(22) PCT Filed: Oct. 4, 2017

(86) PCT No.: PCT/EP2017/001170
§ 371 (c)(1),
(2) Date: Apr. 18, 2019

(87) PCT Pub. No.: WO2018/072865
PCT Pub. Date: Apr. 26, 2018

(65) Prior Publication Data
US 2019/0247781 A1    Aug. 15, 2019

(30) Foreign Application Priority Data
Oct. 18, 2016 (DE) .................. 102016012391.5

(51) Int. Cl.
| | |
|---|---|
| *C01B 3/56* | (2006.01) |
| *B01D 53/047* | (2006.01) |
| *B01D 53/22* | (2006.01) |
| *B01D 53/32* | (2006.01) |
| *B01D 53/86* | (2006.01) |
| *C01B 3/50* | (2006.01) |

(52) U.S. Cl.
CPC ......... *B01D 53/047* (2013.01); *B01D 53/229* (2013.01); *B01D 53/323* (2013.01); *B01D 53/869* (2013.01); *B01D 53/8671* (2013.01); *C01B 3/50* (2013.01); *C01B 3/56* (2013.01); *B01D 2255/1021* (2013.01); *B01D 2255/1023* (2013.01); *B01D 2255/2092* (2013.01); *B01D 2255/20715* (2013.01); *B01D 2255/20761* (2013.01); *B01D 2255/20792* (2013.01); *B01D 2256/16* (2013.01); *B01D 2257/104* (2013.01); *B01D 2259/818* (2013.01); *C01B 2203/0465* (2013.01)

(58) Field of Classification Search
CPC ............... B01D 53/323; B01D 53/229; B01D 53/8671; B01D 53/869; B01D 53/047; B01D 2255/20715; B01D 2255/2092; B01D 2255/1023; B01D 2255/20792; B01D 2255/1021; B01D 2255/20761; B01D 2256/16; B01D 2257/104; B01D 2258/0283; B01D 2259/818; C01B 3/50; C01B 3/508; C01B 3/56; C01B 2203/0465; C10K 1/002; C21B 2100/02
See application file for complete search history.

(56) References Cited

U.S. PATENT DOCUMENTS

| | | | |
|---|---|---|---|
| 7,785,550 B2 | 8/2010 | Hoffmann et al. | |
| 2008/0216652 A1 | 9/2008 | Keller et al. | |
| 2008/0311015 A1 | 12/2008 | Hoffmann et al. | |
| 2021/0309517 A1 * | 10/2021 | Russell | ............... B01D 53/261 |

FOREIGN PATENT DOCUMENTS

| | | | |
|---|---|---|---|
| CN | 1644661 A | 7/2005 | |
| CN | 106 698 343 A * | 5/2017 | ............... C01B 3/50 |
| DE | 2718076 A1 | 10/1978 | |
| EP | 1967491 A2 | 9/2008 | |
| EP | 2002877 A1 | 12/2008 | |
| JP | 2002 212 575 A * | 7/2002 | ............... C10K 3/04 |

OTHER PUBLICATIONS

International Search Report for PCT/EP2017/001170 dated Nov. 1, 2018.
English Abstract of DE2718076, Publication Date: Oct. 26, 1978.
English Abstract of CN 1644661, Publication Date: Jul. 27, 2005.

* cited by examiner

*Primary Examiner* — Timothy C Vanoy
(74) *Attorney, Agent, or Firm* — Millen White Zelano & Branigan, PC; Brion P. Heaney

(57) ABSTRACT

The invention relates to a process for recovering hydrogen (b) from crude gas (a) from a coke oven (110) in which the crude gas (a) produced in the coke oven (110) is initially compressed and in which impurities are subsequently removed from the crude gas (a) by pressure swing adsorption, wherein oxygen is depleted from the crude gas (a) using nonthermal plasma prior to the pressure swing adsorption, and to a plant for recovering hydrogen from crude gas.

20 Claims, 3 Drawing Sheets

METHOD AND INSTALLATION FOR OBTAINING HYDROGEN

The invention relates to a process and a plant for recovering hydrogen from crude gas produced in a coke oven according to the preamble of the independent claims.

PRIOR ART

Steel works sites may include cokeries in which coke required for steel production is produced. Coke may be obtained for example from bituminous coal in so-called coke ovens. A plurality of coke ovens may be provided in particular in the form of a so-called coke oven battery, i.e. a plurality of consecutive coke ovens.

A further product produced in addition to the coke is so-called coke oven gas/crude gas. This crude gas may comprise about 60% to 65% hydrogen, about 20% to 25% methane and smaller proportions of inter alia nitrogen, carbon monoxide, carbon dioxide, oxygen and heavy hydrocarbons. The precise composition generally varies depending on how the coke oven is operated and the coal is employed.

The hydrogen may be obtained from the crude gas in very pure form. To this end the crude gas may be initially compressed and subsequently supplied to a pressure swing adsorption plant. Pressure swing adsorption makes it possible to remove impurities from the crude gas and provide a high-purity stream of hydrogen. When reference is made here and hereinbelow to hydrogen obtained from crude gas this is to be understood as also encompassing a gas mixture having a high proportion of hydrogen, in particular at least 90, 95 or 99 mol %.

Recovering hydrogen from a crude gas from a coke oven by pressure swing adsorption is known per se and more particularly described for example in Yang and Lee: Adsorption dynamics of a layered bed PSA for H2 recovery from coke oven gas, AIChE Journal, Volume 44, Issue 6, June 1998, pages 1325-1334 or Takeuchi et. al.: Hydrogen Separation from COG (Coke Oven Gas) by PSA, Journal of the Fuel Society of Japan 62(12), pages 989-994, December 1983.

However, a problem in such processes may be that the coke ovens which are generally operated at negative pressure may suffer from leaks. Such leaks may become more frequent with increasing age in particular. Leaks can allow ambient air and thus also oxygen to get into the coke oven and thus into the crude gas. The higher the proportion of oxygen in the crude gas, the higher the risk of forming an ignitable mixture together with the hydrogen or other gases inside the pressure swing adsorption plant in certain process steps and/or in the residual gas of the pressure swing adsorption plant.

It is possible to convert the oxygen with catalysts, for example by reacting oxygen with hydrogen to afford water/water vapor, thus further increasing the purity of the hydrogen. Such catalysts are known for example as "DeOxo" catalysts. However, since the crude gas contains many impurities, such catalysts would be damaged rapidly and would not have a long lifetime. Accordingly, such catalysts are only employed after the pressure swing adsorption, thus increasing the purity of the hydrogen but not avoiding/reducing the ignitable mixture and in particular also affording a moist product gas which must generally be subjected to afterdrying.

Against this background the present invention has the object of providing an improved and especially safer option for recovering hydrogen from crude gas produced in a coke oven.

DISCLOSURE OF THE INVENTION

This object is achieved by a process and a plant for recovering hydrogen having the features of the independent claims. Embodiments are provided by the dependent claims and by the description which follows.

Advantages of the Invention

The present invention proceeds from a known-per-se process/plant for recovering hydrogen from crude gas produced in a coke oven such as was more particularly described at the outset. The crude gas produced in the coke oven is initially compressed and subsequently impurities are removed using pressure swing adsorption.

According to the invention oxygen is depleted from the crude gas using a nonthermal plasma prior to the pressure swing adsorption. Nonthermal plasma is herein to be understood as meaning a plasma which is not in thermal equilibrium, i.e. that the electrons in the plasma have a much higher energy/temperature than the remaining constituents which are often only at room temperature or slightly higher, for example up to about 325 K. The temperature of the electrons may be for example about $10^5$ K or higher.

Another type of plasma, by contrast, is thermal plasma, i.e. plasma in thermal equilibrium in which the electrons and the remaining constituents have approximately the same energy/temperature which is generally very high, for example between several 1000 K and $10^6$ K.

Nonthermal plasma may be produced in particular by dielectric barrier discharge (DBD, also known as silent electrical discharge) or using microwaves. In the case of the former, a dielectric material/a dielectric layer may be provided between two electrodes and an alternating electrical field applied to the electrodes. By contrast, the microwaves may be produced in a magnetron and conducted into a reaction space.

Using the nonthermal plasma, the oxygen in the crude gas can react with other fractions in the crude gas and thus may be removed/depleted from the crude gas. It is accordingly possible to reduce the formation of an ignitable mixture of oxygen and hydrogen and/or other flammable gases in the pressure swing adsorption/in the residual gas formed there. Depending on the type of the plant it may be possible to achieve a depletion to less than 200 ppm oxygen proportion (based on the amount of substance, i.e. 0.02 mol %) while a feed gas mixture is generally—at least intermittently—ignitable in the pressure swing adsorption plant (at least in certain process steps) or in the residual gas of the pressure swing adsorption plant above a proportion of 0.6 mol % based on ignitable mixtures. It is thus possible to make coke oven gases/crude gases usable for an efficient hydrogen recovery even at an oxygen proportion of more than 0.6 mol %.

Another particular advantage is that this also makes it possible to retrofit all the plants for recovery of hydrogen from crude gas from a coke oven. Coke ovens may have a maximum operating life of 30 to 70 years which generally means that leaks and thus the proportion of oxygen in the crude gas increase.

Oxygen is preferably depleted from the crude gas by using the thermal plasma to activate a catalytic oxygen removal. Such a catalytic oxygen removal may be performed using in particular catalysts comprising platinum and/or palladium and/or copper and/or zinc, in particular on aluminum or aluminum oxide. The catalyst may be arranged in a plasma field of the thermal plasma or downstream of the plasma field with respect to a stream of the crude gas. The catalyst may also be configured such that in particular also higher hydrocarbons from the crude gas are removed/converted. Nickel-containing materials in particular are suitable therefor. Also conceivable is a combination of a plurality of, in particular different, catalysts/materials.

Due to the production of nonthermal plasma, high process temperatures are not required and thus when using a catalyst—in contrast to a conventional application—coking of the catalyst occurs only to a very small exent, if at all. The catalysts mentioned at the outset (so-called DeOxo) may therefore also be used upstream of the pressure swing absorber. Altogether, the depletion of oxygen can be made more effective and efficient. It is in particular expected that the activation by nonthermal plasma allows for reduced doping of the catalyst, thus leading to cost savings.

The crude gas is advantageously pretreated before the pressure swing adsorption and after the crude gas is compressed. This may be effected in particular by adsorptive or catalytic means and/or regeneratively or nonregeneratively and/or using a pressure swing adsorption/membrane hybrid process. In the case where the pressure swing adsorption/membrane hybrid process is used, a suitable membrane may be provided upstream of the pressure swing adsorption for example in order to already allow a certain removal of impurities upstream of the adsorption. The oxygen may be depleted from the crude gas using the nonthermal plasma before or after the crude gas is pretreated before the pressure swing adsorption. The removal of impurities is improved by such a pretreatment upstream of the pressure swing adsorption.

Oxygen may be depleted from the crude gas using the nonthermal plasma after the crude gas is compressed. When a pretreatment is not carried out, the production of the nonthermal plasma may thus be carried out between the compression (i.e. a corresponding compression means) and the pressure swing adsorption (i.e. a corresponding pressure swing adsorber). When a pretreatment is carried out the production of the nonthermal plasma may be carried out between the compression and the pretreatment or between the pretreatment and the pressure swing adsorption. Either variant may be more efficient depending on the situation.

However, it is particularly preferable when oxygen is depleted from the crude gas using the nonthermal plasma before the crude gas is compressed. The production of the nonthermal plasma is thus carried out before the compression (i.e. upstream of a corresponding compression means). This is the earliest possible point in the process at which the depletion may be carried out. This is advantageous in particular if hydrocarbons would otherwise be oxidized in order to reduce fouling of the compression means.

A plant for recovering hydrogen from crude gas comprises a coke oven in which the crude gas is producible, a compression means to which the crude gas from the coke oven is suppliable and which is adapted for compressing the crude gas and a pressure swing adsorber to which the crude gas is suppliable after exiting the compression means and which is adapted for removing impurities from the crude gas and providing hydrogen. Also provided is a plasma generator which is arranged upstream of the pressure swing adsorber and is adapted for producing nonthermal plasma in the crude gas.

For avoidance of repetition, in respect of further advantageous embodiments of a plant according to the invention and advantages thereof, reference is made to the above remarks which apply correspondingly.

The invention is hereinbelow more particularly elucidated with reference to the accompanying drawing which shows various plant parts which are used to elucidate the inventive measures.

DETAILED DESCRIPTION OF THE DRAWING

Figure 1:
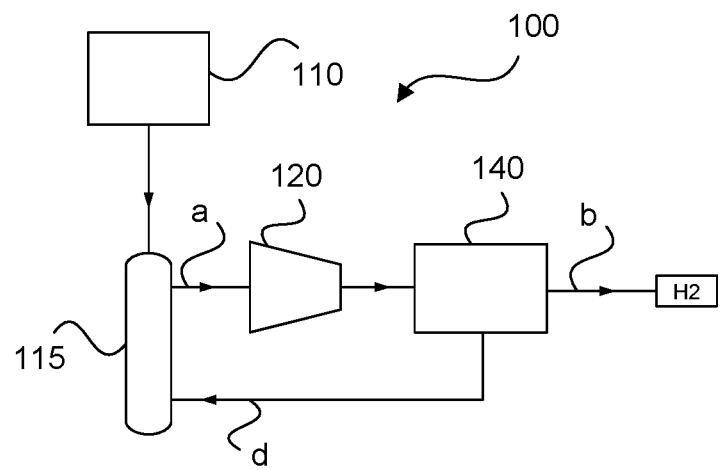
FIG. 1 shows a noninventive plant for recovering hydrogen in the form of a schematic process flow diagram.

FIG. 1 is a schematic diagram of a plant 100 for obtaining hydrogen ($H_2$) from crude gas by means of which the process for recovering hydrogen on which the invention is based shall initially be elucidated.

Produced in a coke oven 110 which may also be a so-called coke oven battery is not only coke but also coke oven gas/crude gas which via a pipeline 115 is supplied as stream a to a compression means 120 which may be a compressor for example. This crude gas may comprise for example about 60% to 65% hydrogen, about 20% to 25% methane and smaller proportions of inter alia nitrogen, carbon monoxide, carbon dioxide, oxygen and heavy hydrocarbons. The precise composition may vary depending on how the coke oven is operated and the coal is employed.

While the crude gas from the coke oven 110 is generally provided at a slight negative pressure, the pressure swing absorber requires a pressure of for example between 5 and 10 bar and in some cases more, which is produced by the compression means. Once the crude gas has been compressed in the compression means 120, i.e. once the pressure has been increased, the crude gas is supplied to the pressure swing adsorber 140.

The pressure swing adsorber 140 removes impurities from the crude gas by pressure swing adsorption. Impurities are to be understood as meaning in particular those constituents in the crude gas (which is a gas mixture) that are undesired, i.e. in the present case all fractions save hydrogen. It will be appreciated that the pressure swing adsorption cannot completely remove all impurities. Typical values for the purity of the hydrogen which may be provided by the pressure swing adsorber 140 as stream b are for example at least 98 mol % or higher.

The gas/the fractions (residual gas) removed in the pressure swing adsorber 140 are supplied to pipeline 115 as stream d and may then be sent for downstream use as heating gas for example.

For a detailed description of the process described here and in particular of the pressure swing adsorption, reference is hereby made for example to the technical literature recited at the outset.

As mentioned, the crude gas (stream a) may have an oxygen proportion of 0.6 mol % or higher which may result in particular from leaks in the coke oven 110 and the ambient air aspirated as a result.

FIGS. 2 to 5 are schematic diagrams of various preferred embodiments of a plant according to the invention by means of which the present invention shall be more particularly elucidated. To a large extent, in particular in terms of the basic components and the corresponding process steps, the plants shown in FIGS. 2 to 5 correspond to the plant 100 of FIG. 1. Reference is thus also made to the above description, identical components being designated with identical reference numerals.

Figure 2:
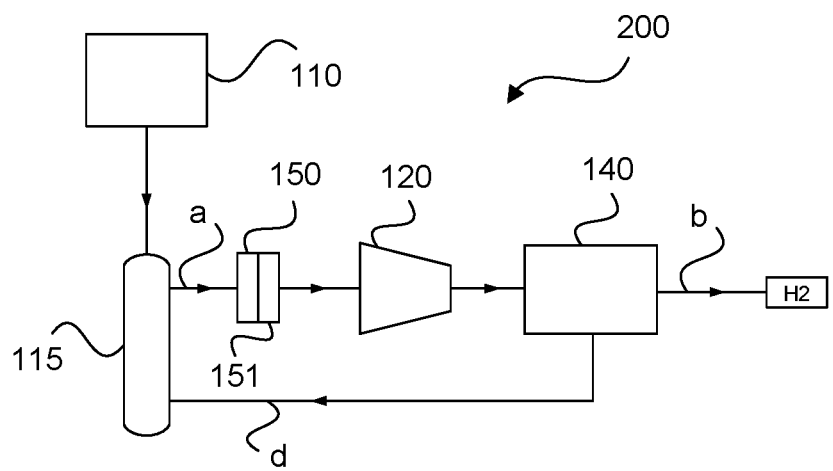
FIG. 2 shows a preferred embodiment of an inventive plant in the form of a schematic process flow diagram.

FIG. 2 shows a plant 200 in which—compared to plant 100 of FIG. 1—a plasma generator 150 and a catalyst 151 are provided between the pipeline 115 and the compression means 120.

The plasma generator 150 may be for example an apparatus comprising two electrodes to which an alternating voltage may be applied and between which a dielectric material has been introduced. This makes it possible to produce a nonthermal plasma in the crude gas (stream a).

The catalyst 151 may be for example a catalyst comprising palladium, platinum, copper or zinc on an aluminum surface. Also conceivable is a combination of a plurality of these materials/a plurality of catalysts each comprising one of these materials.

The catalyst 151 may be arranged in a plasma field formed upon production of the nonthermal plasma. In the case of dielectric barrier discharge the catalyst 151 may thus be arranged for example between the dielectric material and a corresponding electrode. However, it is also conceivable for the catalyst 151 to be arranged downstream of the plasma generator 150 with respect to the stream a and its flow direction.

Production of the nonthermal plasma then makes it possible to carry out the catalytic oxygen removal/the depletion of oxygen from the crude gas particularly efficiently and in particular at comparatively low temperatures. The crude gas is thus already heavily depleted of oxygen in the subsequent compression and in the pressure swing adsorption 140 so that an ignitable mixture is no longer present and a safe removal of further impurities is possible.

Typical values for the purity of the hydrogen which may then be provided by the pressure swing adsorber 140 as stream b are for example at least 99 mol % or higher while a value of 99.9999 mol % is in particular also conceivable.

Figure 3:
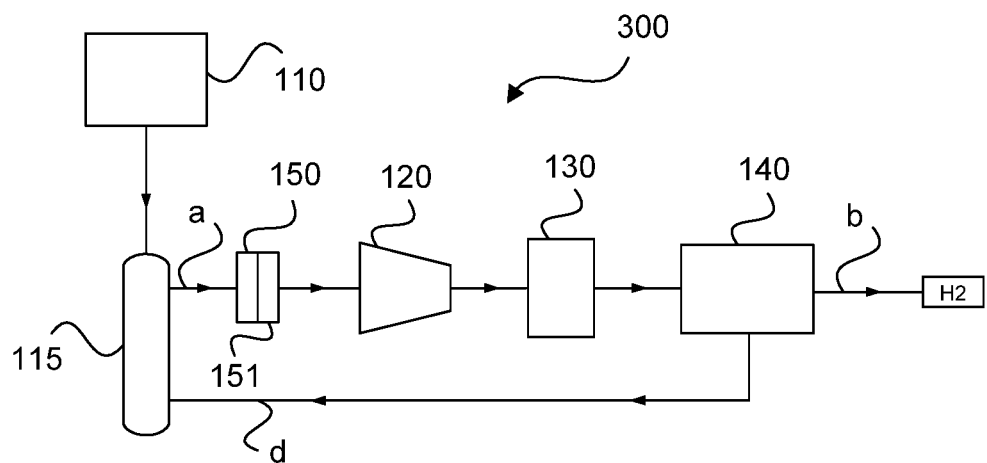
FIG. 3 shows a further preferred embodiment of an inventive plant in the form of a schematic process flow diagram.

FIG. 3 shows a plant 300 in which—compared to plant 200 of FIG. 2—a pretreatment means 130 is provided between the compression means 120 and the pressure swing adsorber 140.

The pretreatment means 130 may for example comprise a membrane which allows for removal of impurities even before the pressure swing adsorption. The membrane thus provides together with the pressure swing adsorber 140 a two-stage pressure swing adsorption/membrane hybrid process for removal of impurities.

Figure 4:
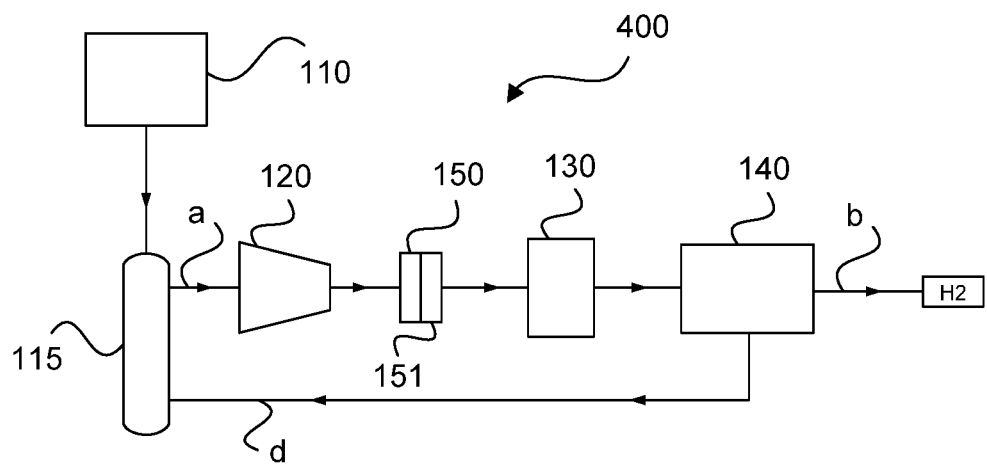
FIG. 4 shows a further preferred embodiment of an inventive plant in the form of a schematic process flow diagram.

FIG. 4 shows a plant 400 in which—compared to plant 300 of FIG. 3—the plasma generator 150 and the catalyst 151 are provided not between the pipeline 115 and the compression means 120 but between the compression means 120 and the pretreatment means 130.

Figure 5:
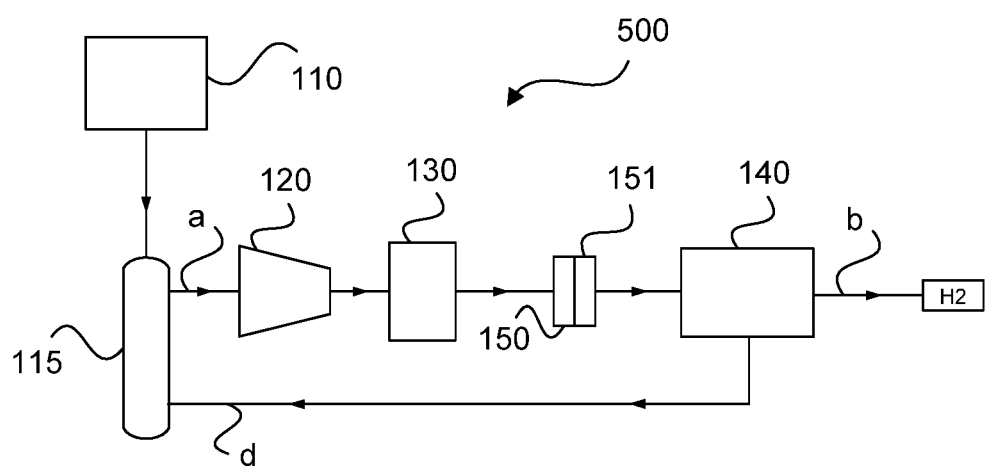
FIG. 5 shows a further preferred embodiment of an inventive plant in the form of a schematic process flow diagram.

FIG. 5 shows a plant 500 in which—compared to plant 400 of FIG. 4—the plasma generator 150 and the catalyst 151 are provided not between the compression means 120 and the pretreatment means 130 but between the pretreatment means 130 and the pressure swing adsorber 140.

The variants shown in FIGS. 4 and 5 may allow more efficient removal of oxygen compared to the variant from FIG. 3 depending on the available plant/options.

It will be appreciated that further variants are also conceivable. Thus for example in a plant without a pretreatment means, as is shown for example in FIG. 2, the plasma generator 150 and the catalyst 151 may also be provided between the compression means and the pressure swing adsorber.

The invention claimed is:

1. A process for recovering hydrogen from crude gas from a coke oven, said process comprising:
   initially compressing a crude gas produced in the coke oven,
   removing impurities from the crude gas by pressure swing adsorption, and
   depleting oxygen from the crude gas using nonthermal plasma prior to the pressure swing adsorption.

2. The process as claimed in claim 1, wherein oxygen is depleted from the crude gas by using the nonthermal plasma to activate a catalytic oxygen removal.

3. The process as claimed in claim 2, wherein the catalytic oxygen removal is performed using platinum and/or palladium and/or copper and/or zinc as catalyst.

4. The process as claimed in claim 2, wherein the catalytic oxygen removal is performed using at least one catalyst arranged in a plasma field of the nonthermal plasma or downstream of a plasma field of the nonthermal plasma with respect to a stream of the crude gas.

5. The process as claimed in claim 2, wherein the catalytic oxygen removal is performed using platinum and/or palladium and/or copper and/or zinc as catalyst on aluminum or aluminum oxide.

6. The process as claimed in claim 1, wherein the nonthermal plasma is produced by dielectric barrier discharge or using microwaves.

7. The process as claimed in claim 1, wherein the crude gas is pretreated before the pressure swing adsorption and after the crude gas is compressed.

8. The process as claimed in claim 7, wherein oxygen is depleted from the crude gas using the nonthermal plasma before the crude gas is pretreated and before the pressure swing adsorption.

9. The process as claimed in claim 7, wherein oxygen is depleted from the crude gas using the nonthermal plasma after the crude gas is pretreated and before the pressure swing adsorption.

10. The process as claimed in claim 1, wherein oxygen is depleted from the crude gas using the nonthermal plasma after the crude gas is compressed.

11. The process as claimed in claim 1, wherein oxygen is depleted from the crude gas using the nonthermal plasma before the crude gas is compressed.

12. The process as claimed in claim 1, wherein the crude gas is pretreated, before the pressure swing adsorption and after the crude gas is compressed, by adsorptive or catalytic means.

13. The process as claimed in claim 1, wherein the crude gas is pretreated, before the pressure swing adsorption and after the crude gas is compressed, regeneratively or nonregeneratively.

14. The process as claimed in claim 1, wherein the crude gas is pretreated, before the pressure swing adsorption and after the crude gas is compressed, using a membrane process for removal of impurities.

15. The process as claimed in claim 14, wherein oxygen is depleted from the crude gas using the nonthermal plasma before the crude gas is pretreated and before the pressure swing adsorption.

16. The process as claimed in claim 14, wherein oxygen is depleted from the crude gas using the nonthermal plasma after the crude gas is pretreated and before the pressure swing adsorption.

17. A plant for recovering hydrogen from crude gas comprising:
a coke oven in which the crude gas is producible,
a compression means to which the crude gas from the coke oven is suppliable and which is adapted for compressing the crude gas,
a pressure swing adsorber to which the crude gas is suppliable after exiting the compression means and which is adapted for removing impurities from the crude gas and providing hydrogen, and
a plasma generator arranged upstream of the pressure swing adsorber and adapted for producing nonthermal plasma in the crude gas.

18. The plant as claimed in claim 17, further comprising at least one catalyst for removal of oxygen from the crude gas, said catalyst being arranged in a plasma field of nonthermal plasma producible by the plasma generator or being arranged downstream of a plasma field of nonthermal plasma producible by the plasma generator with respect to a stream of the crude gas.

19. The plant as claimed in claim 17, further comprising a pretreatment means through which the crude gas is conductible before the crude gas is supplied to the pressure swing adsorber.

20. A plant for recovering hydrogen from crude gas comprising:
a coke oven in which the crude gas is producible,
a compressor to which the crude gas from the coke oven is suppliable and which is adapted for compressing the crude gas,
a pressure swing adsorber to which the crude gas is suppliable after exiting the compressor and which is adapted for removing impurities from the crude gas and providing hydrogen, and
a plasma generator arranged upstream of the pressure swing adsorber and adapted for producing nonthermal plasma in the crude gas.

* * * * *